United States Patent
Brown et al.

(10) Patent No.: US 10,795,547 B1
(45) Date of Patent: Oct. 6, 2020

(54) USER-VISIBLE TOUCH EVENT QUEUING

(71) Applicant: Amazon Technologies, Inc., Reno, NV (US)

(72) Inventors: Aaron Michael Brown, Seattle, WA (US); Christopher W. Greene, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 760 days.

(21) Appl. No.: 14/302,261

(22) Filed: Jun. 11, 2014

(51) Int. Cl.
*G06F 3/0484* (2013.01)
*G06F 3/0488* (2013.01)
*G06F 3/0482* (2013.01)

(52) U.S. Cl.
CPC .......... *G06F 3/0484* (2013.01); *G06F 3/0482* (2013.01); *G06F 3/0488* (2013.01)

(58) Field of Classification Search
CPC .. G06F 3/04842; G06F 3/0482; G06F 3/0488; G06F 2203/04108; G06F 17/30899; G06F 3/048; G06F 3/0484; G06T 19/006; G06T 19/20; H04L 67/306; H04L 67/02; H04L 67/10; H04L 63/1416; H04L 67/22; H04N 21/4622; H04N 21/4782; H04N 21/8173
USPC .................................................. 715/764, 856
See application file for complete search history.

(56) References Cited

U.S. PATENT DOCUMENTS

| | | | |
|---|---|---|---|
| 7,467,379 B2 * | 12/2008 | Desbiens | H04L 67/10 709/203 |
| 8,487,895 B1 | 7/2013 | Brown | |
| 9,286,081 B2 * | 3/2016 | Dunn | G06F 9/4443 |
| 9,335,905 B1 * | 5/2016 | Ainslie | G06F 3/0482 |
| 9,377,929 B1 * | 6/2016 | Shrivastava | G06F 3/04817 |
| 9,805,006 B1 * | 10/2017 | Kuhn | G06F 17/30902 |
| 2002/0065912 A1 * | 5/2002 | Catchpole | G06F 17/30873 709/224 |
| 2006/0206803 A1 * | 9/2006 | Smith | G06F 17/30864 715/201 |
| 2009/0207142 A1 * | 8/2009 | Keranen | G06F 3/04845 345/173 |
| 2012/0007866 A1 * | 1/2012 | Tahan | G06F 19/321 345/428 |
| 2012/0110480 A1 * | 5/2012 | Kravets | G06F 17/30905 715/760 |
| 2012/0174121 A1 * | 7/2012 | Treat | G06F 9/542 719/318 |

(Continued)

*Primary Examiner* — Arpan P. Savla
*Assistant Examiner* — Maria S Ayad
(74) *Attorney, Agent, or Firm* — Knobbe, Martens, Olson & Bear, LLP

(57) ABSTRACT

A browser or browser component queues touch events on a user device while an associated network page is being rendered. The browser may store a detected touch event, a location of the touch event, and/or a vector associated with the touch event in a touch events queue implemented by a data repository. The browser may also visually indicate that the touch event has been registered. Once the network page is at least partially interactive, the browser may retrieve the touch event information from the touch events queue and apply the touch event. Prior to or after applying the touch event, the visual indicator that alerts the user that the touch event was registered may be removed. The browser may then re-render and display the network page after the touch event has been applied.

16 Claims, 8 Drawing Sheets

(56) References Cited

U.S. PATENT DOCUMENTS

| | | | |
|---|---|---|---|
| 2012/0233545 A1* | 9/2012 | Ikeda | G06F 3/0488 |
| | | | 715/702 |
| 2012/0290924 A1* | 11/2012 | Vick | G06F 17/272 |
| | | | 715/237 |
| 2012/0316776 A1* | 12/2012 | Brown | G01C 21/3664 |
| | | | 701/428 |
| 2013/0103740 A1* | 4/2013 | Tully | H04N 21/251 |
| | | | 709/203 |
| 2013/0139115 A1 | 5/2013 | Thiruvillamalai et al. | |
| 2013/0151944 A1* | 6/2013 | Lin | G06F 3/0488 |
| | | | 715/234 |
| 2013/0235044 A1* | 9/2013 | Kaleta | G06F 3/0484 |
| | | | 345/473 |
| 2013/0275951 A1* | 10/2013 | Dolby | G06F 11/366 |
| | | | 717/126 |
| 2013/0332867 A1 | 12/2013 | Dunn et al. | |
| 2014/0053057 A1* | 2/2014 | Reshadi | G06F 17/2247 |
| | | | 715/234 |
| 2014/0071060 A1* | 3/2014 | Santos-Gomez | G06F 3/0488 |
| | | | 345/173 |
| 2015/0205585 A1* | 7/2015 | Ubl | G06F 9/45529 |
| | | | 717/146 |
| 2015/0301991 A1* | 10/2015 | He | G06F 17/3089 |
| | | | 715/234 |
| 2016/0275200 A1* | 9/2016 | Yamahara | G06F 3/04842 |

* cited by examiner

USER-VISIBLE TOUCH EVENT QUEUING

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
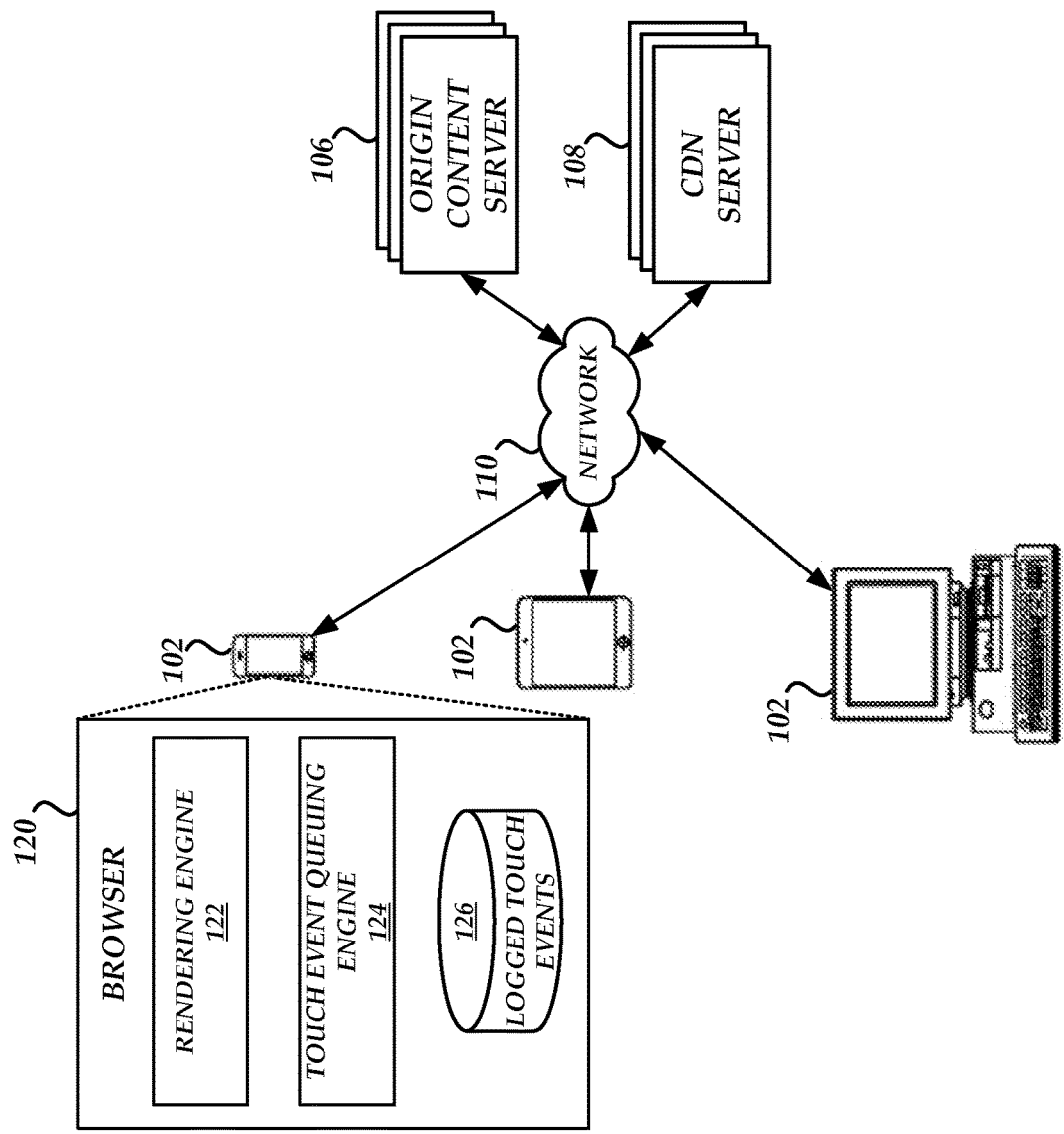
FIG. 1 illustrates an example network environment in which features can be implemented for queuing touch events on a user device, displaying visual indications of the queued touch events, and applying the queued touch events to a network page or a content page.

As described above, when a user requests a page (e.g., a content page, a network page, such as an HTML-based web page, etc.) via a browser, the user may experience a noticeable delay before the page is fully or even partially displayed. In particular, the user may experience a noticeable delay between the time the user requests the page and the time when the page is at least partially interactive. "Interactive" refers to the ability for the user to perform such tasks as scrolling, selecting a link, zooming in or out, etc. A page may be interactive when the browser has parsed the page's code (e.g., the HTML code) into a parse tree (e.g., a document object model (DOM) tree). The browser may parse the page's code into the parse tree at some time after the browser begins loading the page. The page may be interactive before scripts are loaded or parsed and/or before the rendering of the page is complete. A page may be considered "partially interactive" if the page's code has been parsed into the parse tree (e.g., the user can perform at least some of the tasks described above), but at least some interactive elements of the page are not yet available. For example, some scripts (e.g., JavaScript) may load additional content that includes interactive features (e.g., media players, Flash content, etc.). However, the additional content may not be loaded until after generation of the parse tree (e.g., the additional content may be loaded once the user selects an element associated with the script). The delay between the time the user requests the page and the time when the page is at least partially interactive may be referred to as the DOM interactive time. Until the page is at least partially interactive, the user may not be able to perform any actions even if portions of the page have been rendered and are visible. For example, the user may not be able to scroll the page, may not be able to select any links that are visible, may not be able to play any videos that are visible, and/or the like. A significant DOM interactive time (e.g., several seconds or more) may negatively impact the user experience.

One method for improving the user experience is to allow a user to perform actions before the page is at least partially interactive. For example, the user, using a user device having a touch screen, can perform an action that results in a touch event (e.g., a swipe, a pinch, a tap, etc.) registered by the browser. The browser may store the touch event, a location of the touch event, and/or a vector associated with the touch event in a touch events queue implemented by a data repository. For example, if the touch event is a swipe or a pinch, a vector may be stored representing the path of the detected movement. The browser may also visually indicate that the touch event has been registered. For example, the browser may display a color-coded shape (e.g., a circle, a triangle, a rectangle, etc.) at the location (e.g., coordinates that define a boundary of the touch event) where the touch event was detected, where the color and/or shape indicates a type of touch event that was detected. As another example, the browser may display a path (e.g., a line, an arrow, a curve, etc.) at the location where the touch event was detected. As another example, the browser may display a window that textually describes the type of touch event registered and/or the location of the registered touch event. As another example, the browser may display an information box that slides or appears over the page being rendered at the location where the touch event was detected, where the information box describes the type of touch event that was detected. The visual indicator may stay static, persistently glow, change colors, diminish in size over time (e.g., to indicate when the touch event may expire, to indicate when the action corresponding with the touch event may be performed, etc.), and/or the like. In further embodiments or alternatively, the browser provides an audible feedback (e.g., a click sound, a tone, etc.) or a sensory or haptic feedback (e.g., a vibration) that depends on the type of the detected touch event.

If multiple touch events are received before the page is at least partially interactive, the browser may simultaneously indicate visually that the touch events have been registered, and may queue these touch events in the data repository in the order that they were registered. Once the page is at least partially interactive (or a portion or element of the page corresponding with the touch event is interactive), the browser may retrieve the touch event information from the touch events queue implemented by the data repository and apply the touch event(s). If multiple touch events have been registered, the browser may apply the touch events in the order that they were registered. The browser may include a buffer between each touch event application (e.g., 50 ms) or may batch the touch events together. Prior to or after applying the touch event, the visual indicator that alerts the user that the touch event was registered may be removed.

The browser may then re-render and display the page after the touch event has been applied.

In some embodiments, a touch event is deleted from the data repository and the visual indicator associated with the touch event is removed. For example, if a browsing session ends, the touch event may be removed. As another example, if the page does not become at least partially interactive within a threshold time after the touch event is registered, the touch event and its visual indicator may be removed. As another example, another action (e.g., selection of the back button, the forward button, the home button, etc.) may supersede a touch event, resulting in the removal of the touch event from the queue.

System Components

FIG. 1 illustrates an example network environment in which features can be implemented for queuing touch events on a user device, displaying visual indications of the queued touch events, and applying the queued touch events to a network page or a content page. The network environment shown in FIG. 1 includes various user devices 102 and various content sources, including origin content servers 106 and content delivery network ("CDN") servers 108. The system components may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In some embodiments, not shown, the network environment additional includes one or more intermediary systems. In such a configuration, a user device 102 may request content via the intermediary system and the intermediary system may request content from the content sources 106 or 108.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The browser application 120 may include a rendering engine 122 that requests and receives content from the original content server 106 and/or the CDN server 108. The rendering engine 122 (or some other module of the browser application 120) can use the received content to render and display a network page or a content page on the user device 102.

Using, for example, a touch interface of the user device 102, a user may perform an action that results in the registration of a touch event. An indication that a touch event has been registered may be provided to the browser application 120. For example, the browser application 120 may further include a touch event queuing engine 124 that receives the indication that a touch event has been registered. The touch event queuing engine 124 may store the touch event, a location (e.g., coordinates that define a boundary of the touch event) of the touch event, and/or a vector associated with the touch event in a data repository, such as logged touch events data store 126. The touch event queuing engine 124 and the logged touched events data store 126 collectively implement a touch events queue. The touch event queuing engine 124 may interpret the stored touch event and its associated data in the context of the network page (e.g., the partially rendered network page) to determine what type of touch event occurred and what type of visual indicator should therefore be displayed. Based on this determination, the touch event queuing engine 124 may instruct the rendering engine 122 to display a visual indicator that alerts the user that the touch event has been registered.

In an embodiment, the rendering engine 122 is configured to determine when a network page, such as an HTML-based web page, is at least partially interactive (or a portion or element of the network page corresponding with the touch event is interactive). For example, the rendering engine 122 may detect a change in an interactivity state of the network page. The network page may transition from a no interactivity state (e.g., a state in which the network page's code has not been parsed into the DOM tree) to a partial interactivity state (e.g., a state in which the network page's code is parsed into the DOM tree) or a full interactivity state (e.g., a state in which the network page's code is parsed into the DOM tree and any additional interactive elements are available). Once the network page is at least partially interactive, the touch event queuing engine 124 may be notified. The touch event queuing engine 124 can retrieve one or more touch events and/or each touch event's associated information from the logged touch events data store 126 and apply one or more touch events to the network page at the location indicated. For example, the touch event queuing engine 124 can retrieve all queued touch events. Applying a touch event may include manipulating the network page at the location indicated based on an action represented by the touch event. Upon application of a touch event, the touch event and its associated information may be deleted from the logged touch events data store 126.

In an embodiment, the touch event queuing engine 124 applies the retrieved touch events in the order that the touch events were registered. The touch event queuing engine 124 may instruct the rendering engine 122 to re-render the network page after application of each touch event. Alternatively, the touch event queuing engine 124 may instruct the rendering engine 122 to re-render the network page after all touch events have been applied.

As described above, the logged touch events data store 126 may store touch events, a location in the network page where each touch event occurred, and/or vectors associated with a touch event. The logged touch events data store 126 may store touch events and associated data in an order that the touch events are registered (e.g., thereby implementing a touch events queue). In some embodiments, the information stored in the logged touch events data store 126 is kept for a specific time period and then automatically deleted. For example, data related to a browsing session may be stored while the browsing session is ongoing and then deleted when the browsing session ends. Thus, in this example, browsing may be optimized without compromising privacy.

As another example, data related to a browsing session (e.g., touch events and associated information) may be stored for a set period of time and then deleted once the period of time expires. Thus, in this example, browsing may be optimized such that only the most recent touch events are applied and/or touch events that a user may have forgotten about are not applied. In some embodiments, the information stored in the logged touch events data store 126 is automatically deleted upon the occurrence of certain events. For example, selection of the back button, the forward button, the home button, and/or the like may supersede a touch event (e.g., the touch event is no longer applicable), resulting in the deletion of the touch event.

In some embodiments, the browser application 120 may be a conventional web browser that is not specifically designed or configured to queue touch events. For example, the browser application 120 may use or otherwise be associated with a touch event queuing engine 124, such as a browser add-in or extension, that is not a native part of the browser application 120. In some embodiments, applications other than a browser application 120 may include or use a touch event queuing engine 124 (or some similar module) to queue and apply touch events. For example, content aggregators or other specialized content display applications for mobile devices (e.g., Flipboard) may utilize a touch events queuing engine 124.

The browser application 120 and/or the user device 102 may include additional modules, components, data stores, and the like to provide the features described herein. For example, the browser application 120 may include a cache that stores content items received form content sources 106 and 108. Information may be stored in the cache when content is retrieved from the content sources 106 and 108. The cache may also dynamically update as new content is retrieved from the content sources 106 and 108.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102 or other devices or service providers. In some embodiments, one or more content servers 106 may be associated one or more CDN service providers (e.g., entities that manage multiple CDN servers 108), application service providers, etc.

Example Process for Queuing Touch Events

Figure 2:
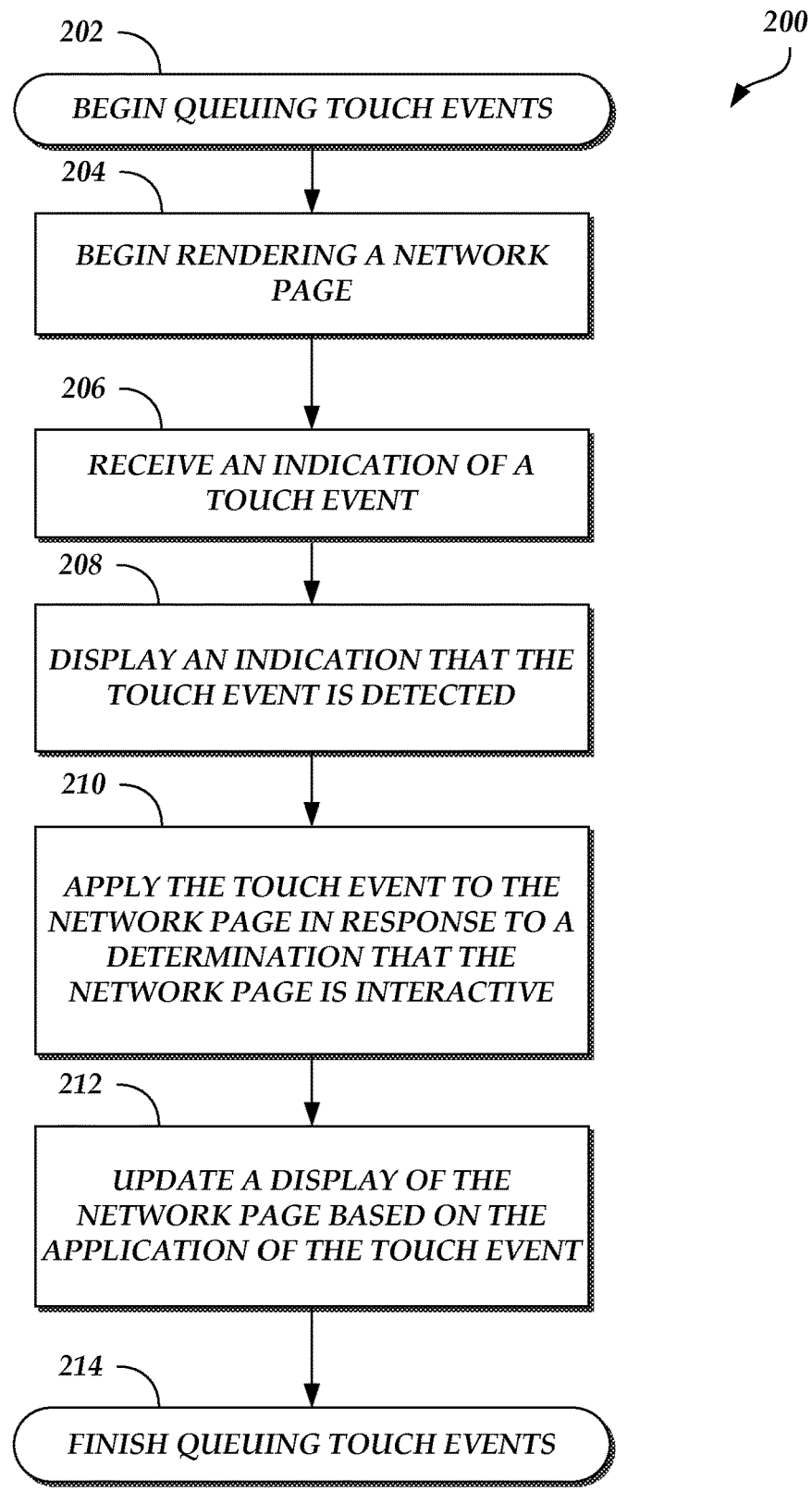
FIG. 2 illustrates a touch event queuing process that may be implemented by a user device.

FIG. 2 illustrates a touch event queuing process 200 that may be implemented by a user device. As an example, the user device 102 (e.g., the browser application 120) of FIG. 1 can be configured to execute the touch event queuing process 200. The touch event queuing process 200 begins at block 202.

At block 204, the rendering of a network page begins. In an embodiment, as the network page is being rendered, a display of the user device 102 shows the portion of the network page that has been rendered. However, the network page may not yet be fully or partially interactive.

At block 206, an indication of a touch event is received. In an embodiment, a user performs an action that results in a touch event. The user may perform the action using a touch interface of the user device 102. The indication of the touch event may include a type of the touch event (e.g., a swipe, a pinch, a tap, etc.), a location of the touch event (e.g., coordinates in the network page that define a boundary of the touch event), and/or a vector associated with the touch event (e.g., a path that tracks a movement detected by the touch interface if the touch event is a swipe or a pinch). The indication of the touch event may be received before the network page is at least partially interactive. In further embodiments, the touch event and information associated with the touch event is stored in a data repository, such as the logged touch event data store 126, that implements a touch events queue.

At block 208, an indication that the touch event is detected is displayed. In an embodiment, the indication is a visual indicator that alerts the user to a type and location of the touch event. The visual indicator may, for example, include one or more of the following: (1) a color-coded shape at the location where the touch event was detected, (2) a path (e.g., a line, an arrow, a curve, etc.) at the location where the touch event was detected, (3) a window that textually describes the type of touch event registered and/or the location of the registered touch event, (4) an information box that slides or appears over the page being rendered at the location where the touch event was detected indicating the type of touch event.

At block 210, the touch event is applied to the network page in response to a determination that the network page is interactive. In an embodiment, in response to the determination that the network page is interactive, the touch event is retrieved from the data repository. The touch event is then applied to the network page at the identified location, which may modify an appearance of the network page. In further embodiments, when the touch event is applied, the touch event and information associated with the touch event is deleted from the data repository. In addition, the indication that the touch event is received may no longer be displayed. In some embodiments, the touch event is not applied until the network page is fully interactive. In an embodiment, the touch event is applied to the network page in response to a determination that the corresponding portion or element of the network page is interactive.

At block 212, a display of the network page is updated based on the application of the touch event. In an embodiment, the network page is re-rendered to display the network page after the touch event has been applied. After the display of the network page is updated, the touch event queuing process 200 may be complete, as shown in block 214.

Example Network Page Viewed on a User Device that Queues Touch Events

Figure 3A:
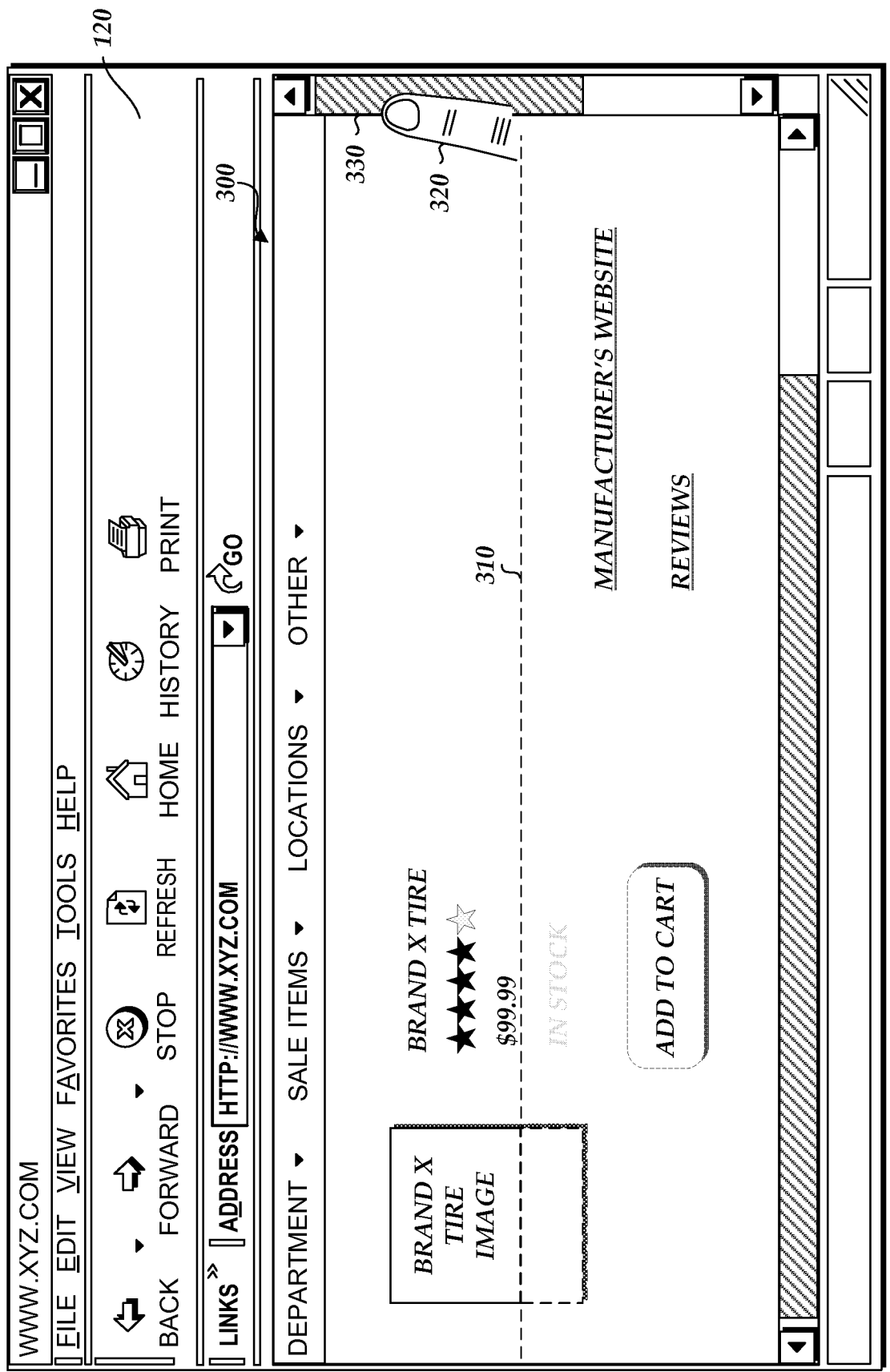
FIGS. 3A-C illustrate an example representation of a network page, such as a web page, viewed on a user device, such as the user device of FIG. 1.
Figure 3B:
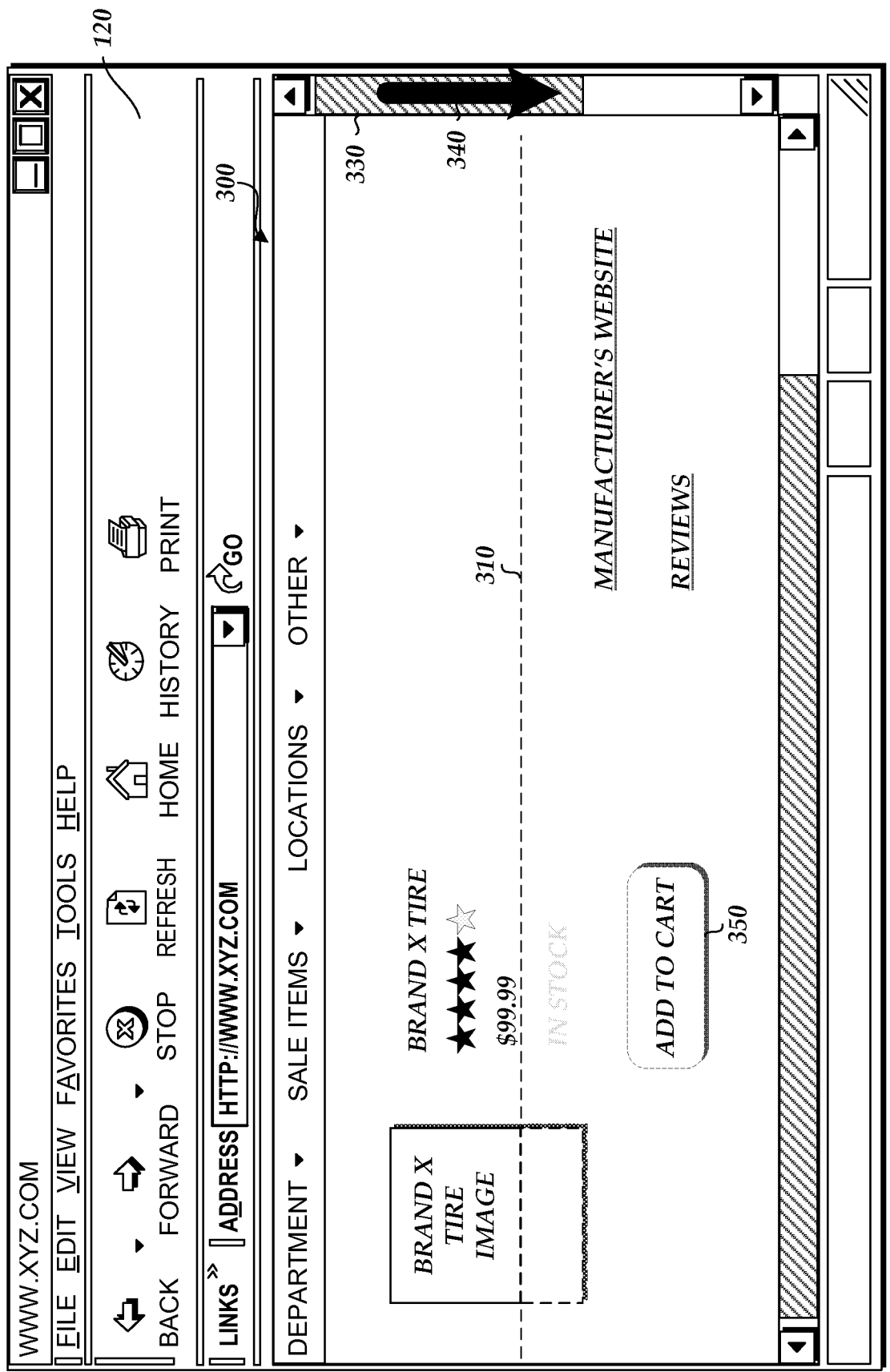
Figure 3C:
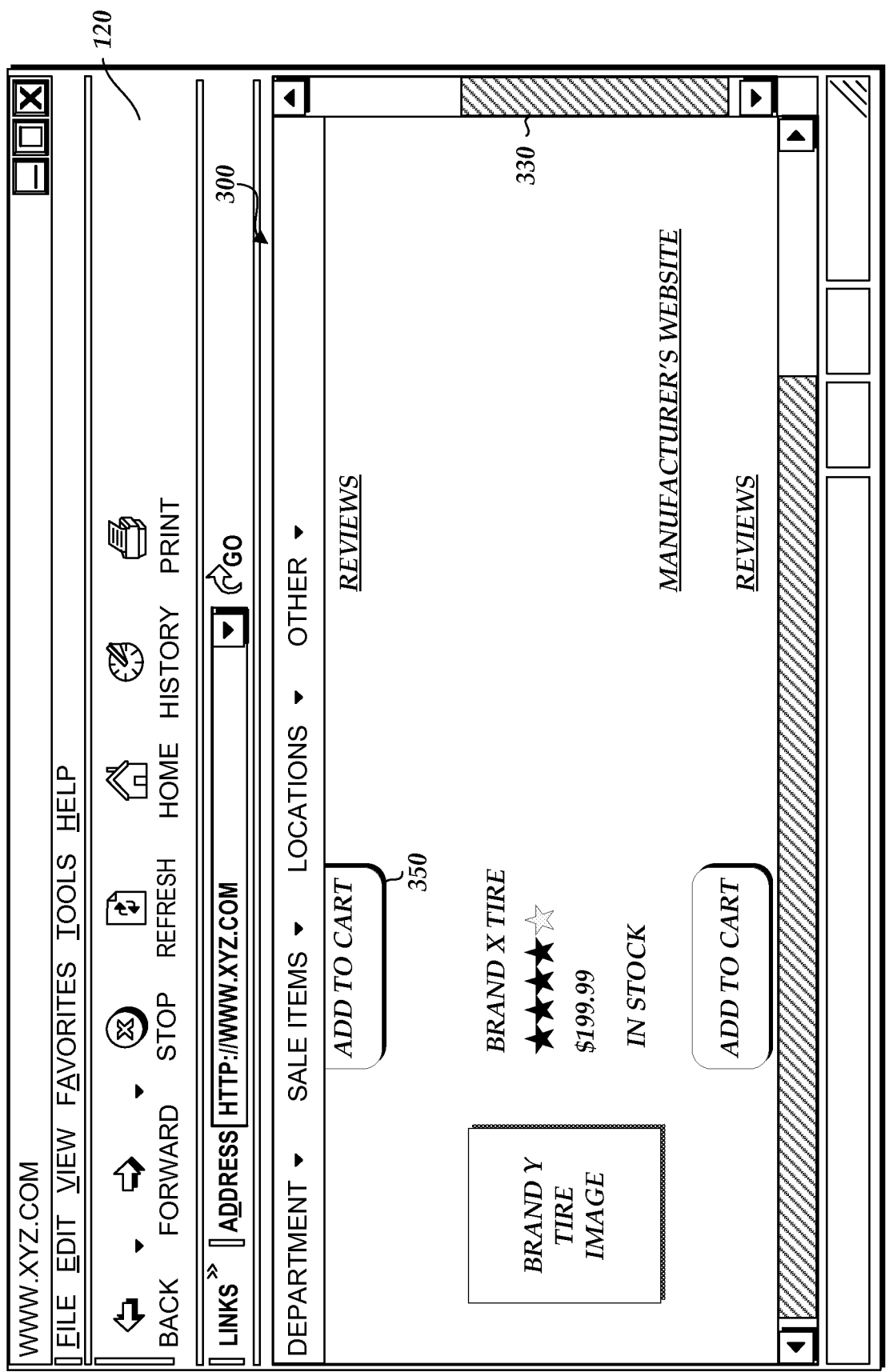

FIGS. 3A-C illustrate an example representation of a network page 300, such as a web page, viewed on a user device, such as the user device 102. The network page 300 may be displayed within the user interface of the browser application 120 of the user device 102. As illustrated in FIG. 3A, the browser application 120 has begun rendering the network page 300. Line 310 may represent the boundary between the portion of the network page 300 that has been rendered and is visible to a user (e.g., the portion above the line 310) and the portion of the network page 300 that has not been rendered and is not visible to the user (e.g., the portion below the line 310). In this example, the network page 300 is not yet fully or partially interactive.

Finger 320 may represent the location at which the user interacts with the touch interface of the user device 102. For example, the user may touch the touch interface (e.g., with a finger) at the location of the finger 320. As another example, the user may place a stylus or other such apparatus at the location of the finger 320. As illustrated in FIG. 3A, the finger 320 is located on scroll bar 330. In an embodiment, the user performs a scrolling action by swiping down along the scroll bar 330. However, because the network page 300 is not fully or partially interactive, the scrolling action may not be performed immediately.

As illustrated in FIG. 3B, instead of performing the scrolling action, the browser application 120 renders and displays path or arrow 340. In an embodiment, upon receiving an indication that the scrolling action occurred, the browser application 120 registers a touch event that corresponds with the scrolling action (e.g., a swipe). The browser application 120 may store the touch event, the location of the touch event (e.g., coordinates that correspond with a first point at which the touch interface detects a touch), and a vector (e.g., the path from the first point at which the touch interface detects a touch to a last point at which the touch interface detects a touch) in the touch events queue implemented by the logged touch events data store 126. The browser application 120 may interpret the stored touch event and its associated data in the context of the partially rendered network page 300 to determine what type of touch event occurred and what type of visual indicator should therefore be displayed. Based on this determine, the browser application 120 may provide a visual indicator that represents the type of touch event and its location. Because the touch event is a swipe, the visual indicator may represent the vector in the form of the path 340. In further embodiments or alternatively, the browser application 120 provides an audible feedback (e.g., a click sound, a tone, etc.) or a sensory or haptic feedback (e.g., a vibration) that depends on the type of the detected touch event.

The path 340 may include an arrow that indicates a direction of the swipe. Alternatively or in addition, the path 340 may be color-coded to indicate that it is a swipe (e.g., as opposed to a pinch). In some embodiments, the path 340 may be statically displayed until the scrolling action is performed or the touch event is deleted from the queue (e.g., the touch event times out and is deleted from the logged touch events data store 126). In other embodiments, the path 340 may change appearances until the scrolling action is performed or the touch event is deleted from the queue, at which point the path 340 may disappear. For example, the path 340 may have a persistent glow, change colors, diminish in size over time, and/or the like.

In some embodiments, not shown, the user may attempt a scrolling action, but the finger 320 may not be placed on the scroll bar 330. Instead, the finger 320 may be placed a certain distance from the scroll bar 330. The browser application 120 may identify an action as a specific touch event if the location of the touch event is within a threshold distance of the target object (e.g., scroll bar, link, button, etc.) in the network page 320. This may be advantageous in situations in which the user performs an action in a portion of the network page 300 that is not yet visible. For example, the user may intend to select button 350, but may touch the touch interface slightly to the left of where the button 350 will eventually be displayed in the network page 300. The browser application 300 may still recognize the button selecting action and register the touch event.

In an embodiment, once the browser application 120 has determined that the network page 300 (or a portion or element of the network page 300 corresponding with the touch event) is at least partially interactive (or fully interactive in some embodiments), the browser application 120 retrieves the touch event and its associated information from the logged touch events data store 126 and applies the touch event to the network page 300. The browser application 120 then may re-render and display the network page 300 after application of the touch event. As illustrated in FIG. 3C, the network page 300 is re-rendered and the browser application 120 displays the network page 300 after application of the touch event that corresponds with the scrolling action. In an embodiment, the path 340 is no longer displayed in the network page 300.

Figure 4A:
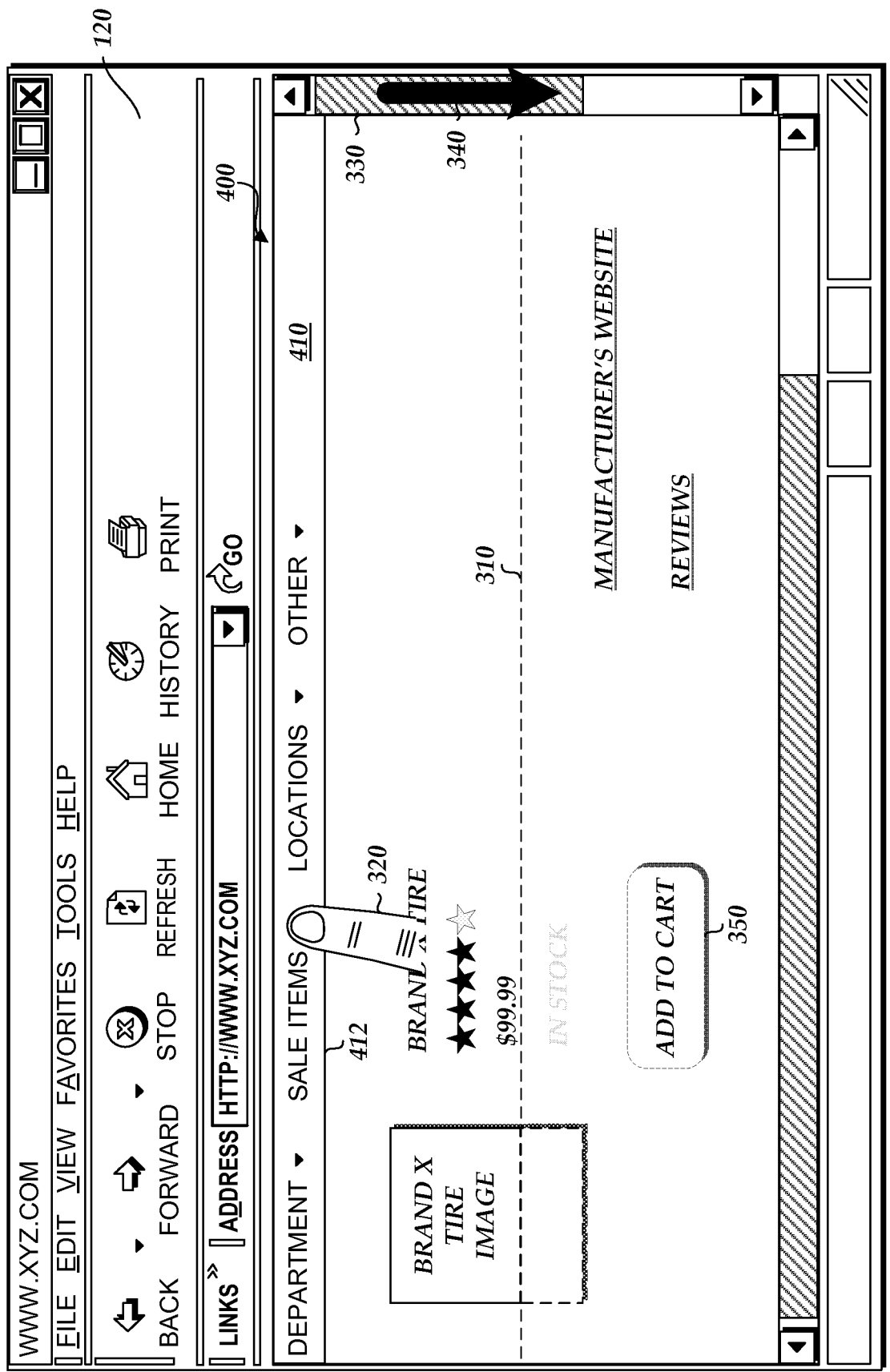
FIGS. 4A-C illustrate another example representation of a network page, such as a web page, viewed on a user device, such as the user device of FIG. 1.
Figure 4B:
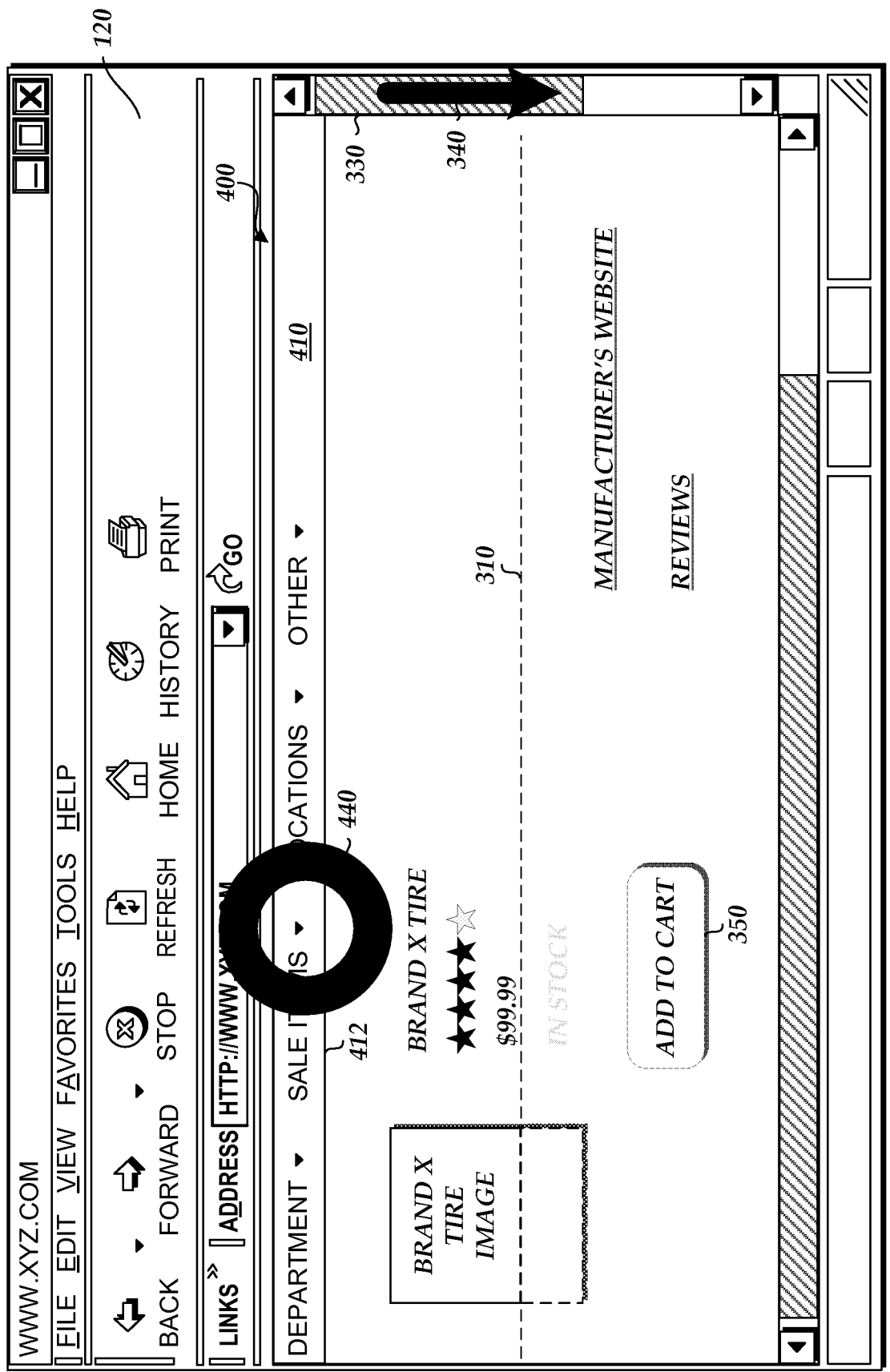
Figure 4C:
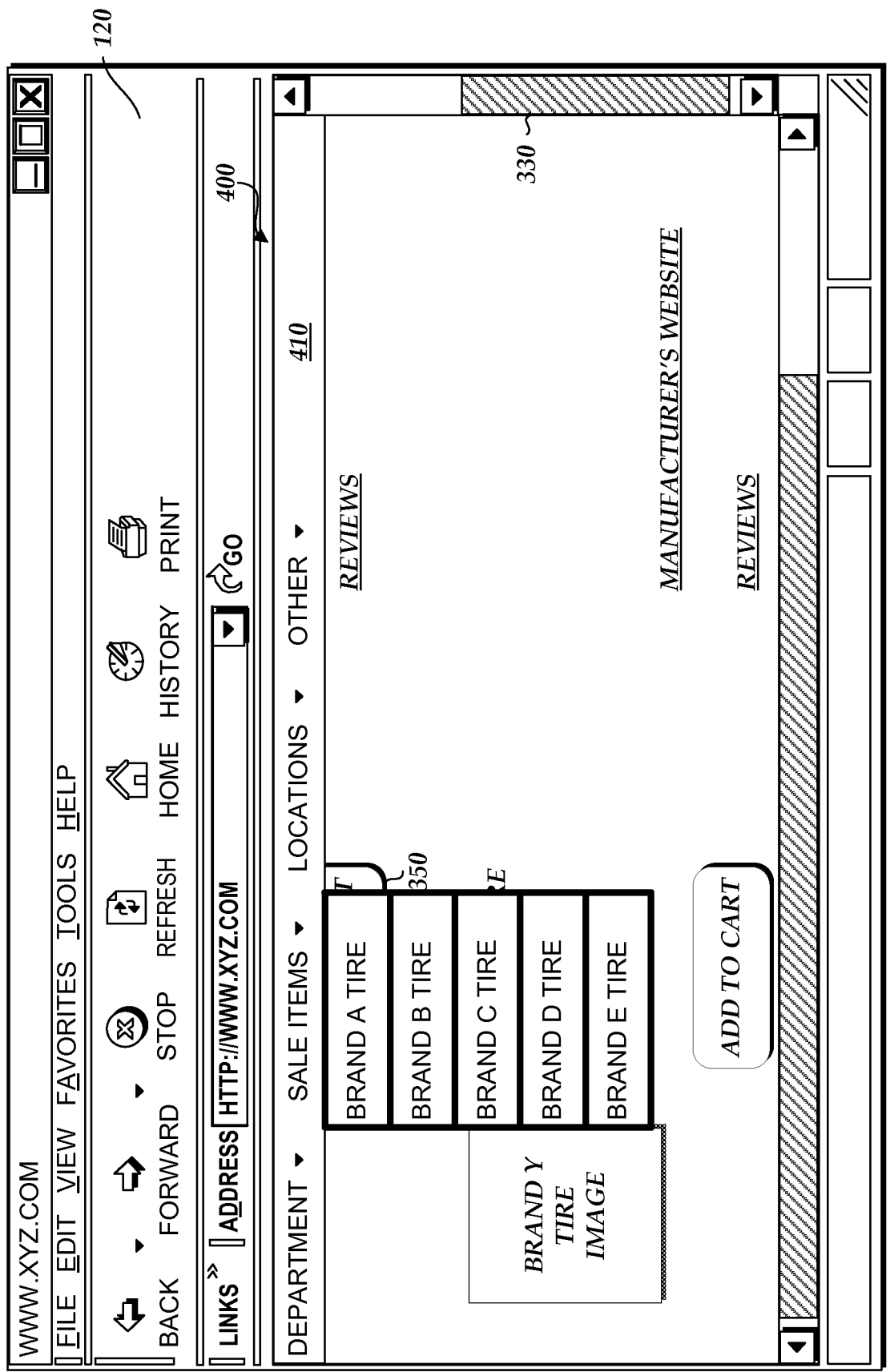

FIGS. 4A-C illustrate another example representation of a network page 400 viewed on a user device, such as the user device 102. The network page 400 may be displayed within the user interface of the browser application 120 of the user device 102. As illustrated in FIG. 4A, the browser application 120 has begun rendering the network page 400. Similar to the network page 300 illustrated in FIGS. 3A and 3B, the line 310 may represent the boundary between the portion of the network page 400 that has been rendered and is visible to a user and the portion of the network page 400 that has not been rendered and is not visible to the. In an embodiment, the network page 400 is not fully or partially interactive. Furthermore, similar to the network page 300 illustrated in FIG. 3B, a touch event corresponding with a scrolling action has been registered and is visually represented by the path 340.

Before the network page 400 is fully or partially interactive, the user may perform another action. For example, the user may select a button 412 in menu 410, as indicated by the finger 320. Again, because the network page 400 is not at least partially interactive, the button selection action may not be performed immediately.

As illustrated in FIG. 4B, instead of performing the button selection action, the browser application 120 renders and displays a circle 440 simultaneously with the path 340. In an embodiment, upon receiving an indication that the button selection action occurred, the browser application 120 registers a touch event that corresponds with the button selection action (e.g., a tap). The browser application 120 may store the touch event and the location of the touch event (e.g., coordinates in the network page 400 that define a boundary of the touch event) in the logged touch events data store 126. As described herein, the logged touch events data store 126 may maintain a queue of touch events. The touch event corresponding with the button selection action may be stored in the queue at a position that is after the position of the touch event corresponding with the scrolling action (e.g., because the touch event corresponding with the scrolling action was registered first).

The circle 440 may be displayed at a location in the network page 400 corresponding to where the touch event was detected. Alternatively or in addition, the circle 440 may be color-coded to indicate that it is a tap (e.g., as opposed to a swipe or a pinch). In some embodiments, the circle 440 may be statically displayed until the button selection action is performed or the touch event is deleted from the queue. In other embodiments, the circle 440 may change appearances until the button selection action is performed or the touch event is deleted from the queue, at which point the circle 440 may disappear. For example, the circle 440 may have a persistent glow, change colors, diminish in size over time, and/or the like.

Once the browser application 120 has determined that the network page 400 (or a portion or element of the network page 400 corresponding with the touch event) is at least partially interactive (or fully interactive in some embodiments), the browser application 120 may retrieve both touch events and their associated information from the logged touch events data store 126 and apply the touch events to the network page 400. In some embodiments, the touch event corresponding with the scrolling action is applied and the browser application 120 re-renders and displays the network page 400 after application of the touch event corresponding with the scrolling action. The path 340 may no longer be displayed, but the circle 440 may continue to be displayed. After waiting a period of time (e.g., 50 ms), the touch event corresponding with the button selection is applied and the browser application 120 re-renders and displays the network page 400 after application of both touch events. In other embodiments, the touch event corresponding with the scrolling action is applied and then the touch event corresponding with the button selection action is applied. The browser application 120 then re-renders and displays the network page 400 after application of both touch events. As illustrated in FIG. 4C, the network page 400 is re-rendered and the browser application 120 displays the network page 400 after application of both touch events. The path 340 and the circle 440 may no longer be displayed in the network page 400 once both touch events are applied.

In further embodiments, not shown, the browser application 120 displays an estimate of a time when a touch event will be performed. For example, the browser application 120 may display an estimate of the exact time that the touch event will be performed. As another example, the browser application 120 may display a countdown that indicates when the touch event will be performed. The browser application 120 may estimate the time based on, for example, the complexity of the page to be rendered. Alternatively, the time estimate may be provided by another device (e.g., an intermediary system).

While aspects of the disclosure are described herein with respect to devices that include touch interfaces, this is not meant to be limiting. The techniques described herein may apply to conventional devices that do not have touch interfaces and/or that support a mouse interface. For example, the techniques described herein can also apply to detected mouse events and/or the like.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of queuing touch events, the method comprising:
as implemented by a user computing device having a touch screen, the user computing device configured with specific executable instructions,
requesting content resources associated with a network page from a host server;
beginning rendering the network page based on the requested content resources;
receiving an indication of a touch event that occurs while the network page is being rendered on the user computing device, wherein the touch event is associated with a selectable display element of the network page and occurs before the selectable display element becomes selectable;
storing a representation of the touch event in a data repository;
displaying an indication of a type and a location of the received touch event on the touch screen before the network page is fully interactive;
detecting a change in an interactivity state of the network page that indicates that the network page has become at least partially interactive, the change in the interactivity state of the network page resulting from a parsing of code of the network page;
retrieving the representation of the touch event from the data repository and applying the touch event on the network page in response to the detected change in the interactivity state of the network page; and
updating a display of the rendered network page based on the application of the touch event.

2. The computer-implemented method of claim 1, further comprising:
receiving an indication of a second touch event that occurs before the network page is fully interactive;
storing a representation of the second touch event in the data repository;
displaying an indication of a type and a location of the received second touch event on the touch screen before the network page is fully interactive;
retrieving the representation of the second touch event from the data repository and applying the second touch event on the rendered network page in response to the updating of the display of the rendered network page; and
updating the display of the rendered network page based on the application of the second touch event.

3. The computer-implemented method of claim 1, further comprising displaying, in response to the touch event, an estimate of an amount of time until the touch event is applied to the network page.

4. The computer-implemented method of claim 1, further comprising updating a display of the rendered network page to remove the indication of the type and the location of the received touch event in response to the application of the touch event.

5. The computer-implemented method of claim 1, wherein the change in the interactivity state is a transition from a no interactivity state to a partial interactivity state.

6. The computer-implemented method of claim 5, wherein the network page is in the partial interactivity state if the user can at least one of scroll the network page, select a first item in the network page, or zoom in on a second item in the network page.

7. The computer-implemented method of claim 1, wherein the indication comprises at least one of a shape that corresponds with the received touch event at the location of the received touch event, text describing the type and the location of the received touch event, or a new window at the location of the received touch event that includes text describing the type of the received touch event.

8. A non-transitory computer storage system comprising a non-transitory storage device, said computer storage system having stored thereon executable program instructions that direct a user computing device having a touch screen to at least:
begin rendering a network page;
receive an indication of a touch event that occurs while the network page is being rendered on the user computing device, wherein the touch event is associated with a selectable display element of the network page and occurs before the selectable display element becomes selectable;

display an indication that the touch event is received on the touch screen while the network page is loading;

apply the touch event to the network page in response to a determination that the network page has become at least partially interactive; and update a display of the network page based on the application of the touch event.

9. The non-transitory computer storage system of claim 8, wherein the executable program instructions further direct the user computing device to at least update a display of the network page to remove the indication that the touch event is received in response to the application of the touch event.

10. The non-transitory computer storage system of claim 8, wherein the indication of the touch event comprises at least one of a shape that corresponds with the received touch event at a location of the touch event, text describing the type and the location of the touch event, or a new window at the location of the touch event that includes text describing the type of the touch event.

11. A non-transitory storage device having stored thereon an executable browser component that directs a user device having a touch screen to implement a process that comprises:

detecting a touch event that occurs on the touch screen while a content page is being rendered on the user device, wherein the touch event is associated with a selectable display element of the content page and occurs before the selectable display element becomes selectable;

storing a representation of the touch event in a memory of the user device;

while the content page is being rendered and before the selectable display element becomes selectable, displaying a visual representation of the touch event on the touch screen; and after the selectable display element becomes selectable, causing the touch event to be applied to the content page and removing the visual representation of the touch event.

12. The non-transitory storage device of claim 11, wherein the process further comprises re-rendering the content page after application of the touch event.

13. The non-transitory storage device of claim 11, wherein the process further comprises retrieving the representation of the touch event from the memory after the selectable display element becomes selectable.

14. The non-transitory storage device of claim 11, wherein the process further comprises deleting the representation of the touch event from the memory in response to a determination that the selectable display element has not become selectable within a first time after rendering of the content page began.

15. The non-transitory computer storage system of claim 11, wherein the touch event comprises at least one of a swipe, a pinch, or a tap.

16. The non-transitory storage device of claim 11, wherein the visual representation of the touch event comprises at least one of a shape that corresponds with a type of the touch event at a location of the touch event, text describing the type and the location of the touch event, or a new window at the location of the touch event that includes text describing the type of the touch event.

* * * * *

UNITED STATES PATENT AND TRADEMARK OFFICE
CERTIFICATE OF CORRECTION

PATENT NO. : 10,795,547 B1
APPLICATION NO. : 14/302261
DATED : October 6, 2020
INVENTOR(S) : Aaron Michael Brown Page 1 of 1

It is certified that error appears in the above-identified patent and that said Letters Patent is hereby corrected as shown below:

At Column 14, Line 22, Claim 15, delete "computer storage system" and insert --storage device--.

Signed and Sealed this
Fifth Day of January, 2021

Andrei Iancu
*Director of the United States Patent and Trademark Office*